United States Patent [19]

Botts et al.

[11] 4,226,369
[45] Oct. 7, 1980

[54] MEANS AND METHOD FOR THE DESTRUCTION OF PARTICLES ENTRAINED IN A GAS STREAM

[75] Inventors: Thomas E. Botts, Wading River; James R. Powell, Shoreham, both of N.Y.

[73] Assignee: The United States of America as represented by the United States Department of Energy, Washington, D.C.

[21] Appl. No.: 934,552

[22] Filed: Aug. 17, 1978

[51] Int. Cl.³ .............................................. B02C 19/00
[52] U.S. Cl. ........................................ 241/1; 241/24; 241/301
[58] Field of Search .................................. 331/DIG. 1; 204/DIG. 11; 219/121 L; 44/1 B; 60/39.46 S; 432/198; 241/1, 30, 301, 24, 81; 299/10, 15

[56] References Cited

U.S. PATENT DOCUMENTS

| | | | |
|---|---|---|---|
| 2,735,265 | 2/1956 | Eastman | 241/1 X |
| 3,207,447 | 9/1965 | Whitham | 241/1 |
| 3,244,412 | 4/1966 | Robinson et al. | 432/198 |
| 3,415,636 | 12/1968 | Upton | 331/DIG. 1 X |

Primary Examiner—Mark Rosenbaum
Attorney, Agent, or Firm—James E. Denny; Richard G. Besha; Leonard Belkin

[57] ABSTRACT

An apparatus and method for the destruction of particles entrained in a gas stream are disclosed. Destruction in the context of the subject invention means the fragmentation and/or vaporization of particles above a certain size limit. The subject invention contemplates destroying such particles by exposing them to intense bursts of laser light, such light having a frequency approximately equal to or less than the mean size of such particles. This invention is particularly adopted to the protection of turbine blades in open cycle coal-fired turbine systems. Means for introducing various chemical species and activating them by exposure to laser light are also disclosed.

16 Claims, 4 Drawing Figures

MEANS AND METHOD FOR THE DESTRUCTION OF PARTICLES ENTRAINED IN A GAS STREAM

BACKGROUND AND BRIEF SUMMARY OF THE INVENTION

The United States Government has rights in this application and in the subject invention pursuant to contract Number EY-76-C-02-0016 with the U.S. Department of Energy.

This invention relates to the production by the combustion of coal, of gas streams which are free of particles above a certain size. More particularly, it relates to the production of streams of coal combustion gases significantly free of particles larger than about 2 to 5 microns and which may be used to drive gas turbines.

Open, combined cycle coal-fired turbine systems (i.e., systems where combustion gas streams are used to directly drive turbines) offer the potential for high thermal efficiency along with good control of air pollutants. A prime concern in this type of power plant is the particulate loading and amount of corrosion to which the turbine is subjected. Such is the case for various coal combustion schemes, including pulverized coal firing, cyclone furnaces, and pressurized fluidized beds. Blade erosion due to particulates or deposition and corrosion due to chemically reactive species present in the turbine inlet stream are reported to be critical problems facing this method of power generation. Turbine lifetime greatly influences the economic attractiveness of open-cycle coal-fired turbines. Clearly, if the particulate and ash fouling problems could be overcome without compromising power cycle performance coal-fired gas turbines would become more attractive.

Removal of particulate matter from the turbine inlet stream by electrostatic precipitators or rotary flow cyclones has been investigated. Although both of these cleanup systems can operate at the high temperature necessary for good turbine efficiency, they do not appear suited to effective removal of particles smaller than $10\mu$. Cyclones modified for the removal of small particulates, such as that described in the application by Warren Winsche (Ser. No. 901,047), commonly owned, have been proposed; however, to the best of the applicants' knowledge, none have been demonstrated. Efficient removal of ash particles less than $10\mu$ in diameter should greatly improve the practicality of coal-fired turbines.

Bag filters have been proposed as a means of achieving the desired low particulate loadings. The mechanical and materials problems of operating a bag filter at high temperatures are very formidable, however, and would require an extensive development effort. In addition, the reliability of the filters must be extremely high. A partial failure of the filter systems could result in excessive turbine erosion. Continuous accurate monitoring of the combustion stream would be required to determine particulate loadings and size distributions.

A radically different and novel approach would be to destroy, rather than remove, all particles above the size limit, approximately 2 to 5 microns, which can be accepted by the turbines without excessive corrosion. By destroy herein is meant to vaporize or fragment so that the resulting fragments are below the above described size limit. This approach is carried out by the apparatus of the subject invention which comprises coal combustion means for producing a particulate laden stream of coal combustion gases connected to a cavity through which the particulate laden gas stream flows, laser means for providing intense illumination of appropriate wave length whereby particles exposed to said illumination will be destroyed, and window means associated with said chamber for introducing said laser illumination into said chamber.

Thus, it is an object of the subject invention to provide a low-cost, fool-proof means for producing coal combustion gas streams significantly free of particulates larger than about 2 to 5 microns and which are suitable for directly driving gas turbines; which comprise destroying particles, above a predetermined size, entrained in a gas flow.

It is another object of the subject invention to provide a means for destroying such particles which will consume only a very small amount of energy in comparison to the energy of the gas flow.

It is also within the contemplation of the subject invention to provide means for injecting particles of various chemical species into the gas stream so that when they are exploded by the laser illumination they will react with and neutralize other objectionable chemical species present in the gas stream and/or replenish protective coatings on downstream components of the system. Means for such injection of particulates would be obvious to those skilled in the art and will not be discussed further herein.

Other objects and advantages of the subject invention will become apparent from the discussion to follow.

DETAILED DESCRIPTION OF THE PREFERRED EMBODIMENT

Figure 1:
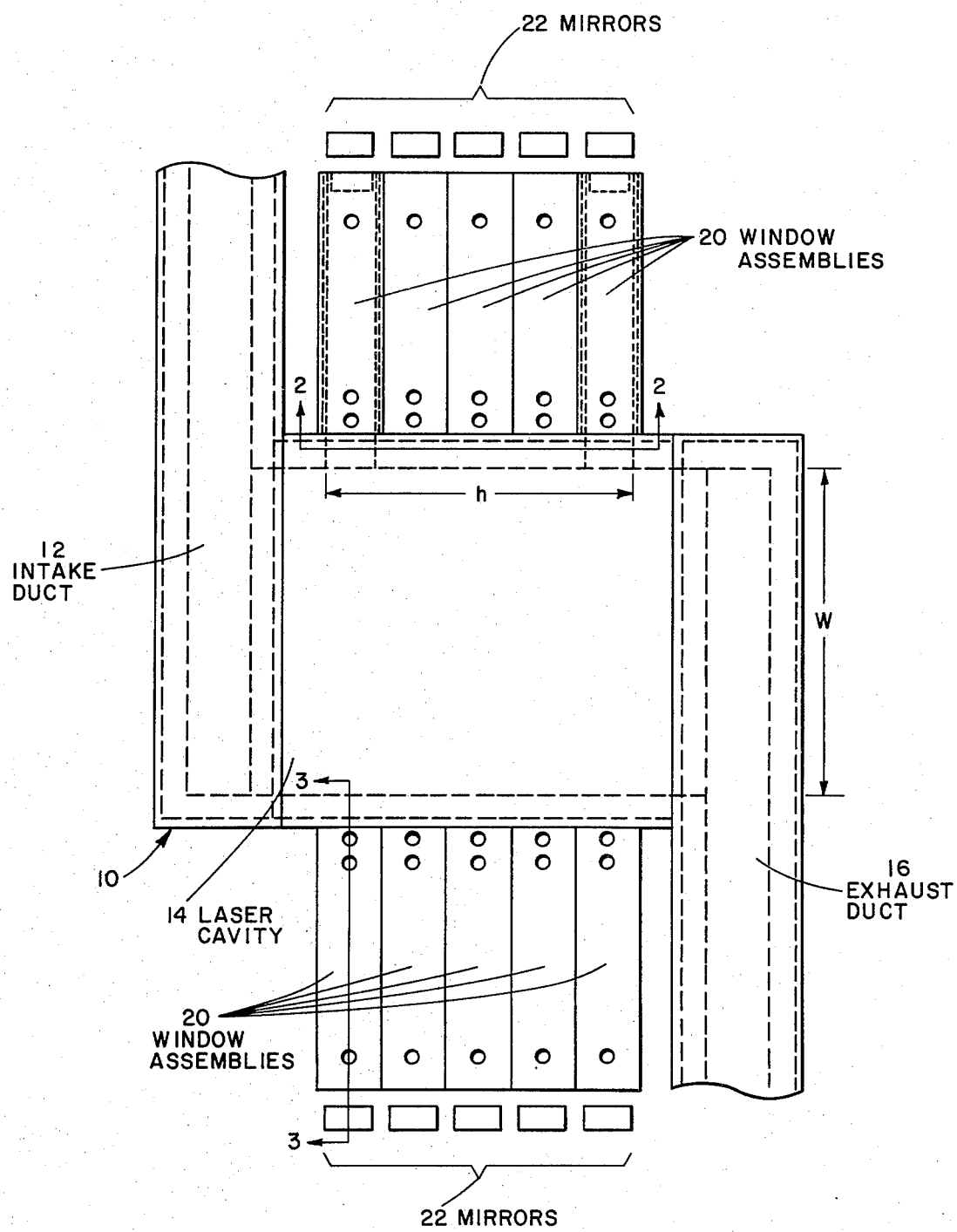
FIG. 1 is a plan view of a preferred embodiment of the subject invention. (Hidden lines shown for window assemblies 20 are typical.)

The embodiment discussed is based on the use of the subject invention in a 1000 Mw(e) coal-fired combined cycle power plant having the following estimated parameters:

| | |
|---|---|
| Coal throughput | 108 kg/sec |
| Excess air | 10% |
| Air throughput (870° C., 25 atm) | 177 m$^3$/sec |
| Mean particle diameter | $10\mu$ |
| Coal-ash load to the turbine (coal is 10% ash, 20% of the ash leaves the combustor and 90% of that is trapped by electrostatic precipitators or cyclones) | 216 g/sec |
| Coal-ash volume fraction | $4.52 \times 10^{-7}$ |
| Mean particle velocity perpendicular to the beam path | 88.5 m/s |
| Energy density incident upon the particle | 20 J/cm$^2$ |
| Energy to vaporize a particle | $1.1 \times 10^{-8}$ J |
| Energy to fracture a sphere and increase its surface area by 400% | $4 \times 10^{-10}$ J |
| Laser pulse length | 1 $\mu$sec |
| Laser wavelength | $10.6\mu$ |

It should be noted that the coal-ash loading is based on the removal of particles larger than approximately 10 microns by the use of cyclones or electrostatic precipitators. Both of these technologies are well established and would be well known to those skilled in the art.

Also, the mean particle diameter is taken, as a worst case approximation, to be the approximate maximum particle diameter remaining after the gas has passed through conventional cyclones or electrostatic precipitators.

Of prime importance to the subject invention is the manner in which laser light and dust particles interact. Light may be absorbed, transmitted, or scattered causing the pellet to melt, vaporize, or fracture. Only light which is absorbed and causes a reduction in particle size is used effectively. Scattered light will eventually appear as heat in the turbine inlet stream, but such a process is only of very minor interest since the power in the laser beam must be orders of magnitude smaller than the thermal power carried by the gas flow.

The dust particles interact with radiation of wavelengths similar to the particle diameters which have been observed by workers in several diverse fields in the past. Astrophysicists have made a study of light passing through dilute clouds of dust. Weapons programs have studied the interaction of dust particles in an air environment with intense bursts of laser light. Research into laser optics and mechanisms of laser damage has shown that particles of a size similar to or smaller than the principle wavelength of the laser suspended in glass will be destroyed at energy densities similar to those proposed for the subject invention.

Catastrophic events have been observed in small particles for photon energy densities near 20 J/cm$^2$. Slightly higher photon energy densities (within a factor of 2) are needed in order to completely vaporize coal-ash particulates with a 1$\mu$ sec. pulse length.

The following publications provide a more detailed description of the interactions between laser light and dust particles and are hereby incorporated by reference. The information contained while providing helpful background is not believed essential to a practical understanding of the invention.

H. C. Van de Hulst, "Light Scattering by Small Particles," J. Wiley and Sons, New York, 1957.

*A. Edwards, J. Fleck, Jr., "Status of Navy "Dirty Air" Breakdown Research," UCID, 17350, LU, December, 1976.

*A. Edwards, N. Ferriter, J. Fleck, Jr., A. M. Winslow, "A Theoretical Description of the Interaction of a Pulsed Laser and a Target in an Air Environment," LCRL-51489, November, 1973.

R. W. Hopper, D. R. Uhlnaan, "Mechanism of Inclusion Damage in Laser Gloss," J. Appl. Phy., 41, 10, pp. 4023-4037, October, 1970.

D. W. Fradin, "Laser-Induced Damage in Solids," Laser Focus, pp. 39-43, February, 1974.

L. I. vanTorne, "Pumping Induced Imperfections in Glass, Nd$^{3+}$ Lasers," Phy. Stat. Sol., 16, 171, pp. 171-182, 1966.

*Available from National Technical Information Service, 5295 Port Royal Road, Springfield, Va. 22151.

Lasers capable of providing the necessary energy density are well within the current state of the art. $CO_2$ lasers are preferred since they provide light of a suitable wavelength, 10.6$\mu$, and are commercially well developed. Suitable suppliers of laser systems would include:
Systems Science and Software
P. O. Box 4803
Hayward, Calif. 94540
and,
Lumonics Research Laboratory
P. O. Box 1800
Kanata, Ontario
Canada Referring now to FIG. 1, the apparatus of the subject invention 10, comprises an intake duct 12, for providing a flow of hot, pressurized, particulate carrying gas, a laser cavity 14, wherein particles are destroyed by exposure to intense laser illumination, an exhaust duct 16 for carrying the hot, pressurized gas, free of large particulates, to turbines for the production of electrical energy, and window assemblies 20 for admitting the laser light into cavity 14. Mirrors 22 may also be provided so that the lasers (not shown) need not be mounted directly in line with window assemblies 20. Preferably the lasers may be mounted alternately above and below the plane of the laser cavity.

The hot, pressurized gases may be produced by burning coal by any of the conventional means known in the art. Further ducts 12, 16 are conventional in design and function and need not be discussed further in the description of the subject invention.

Figure 2:
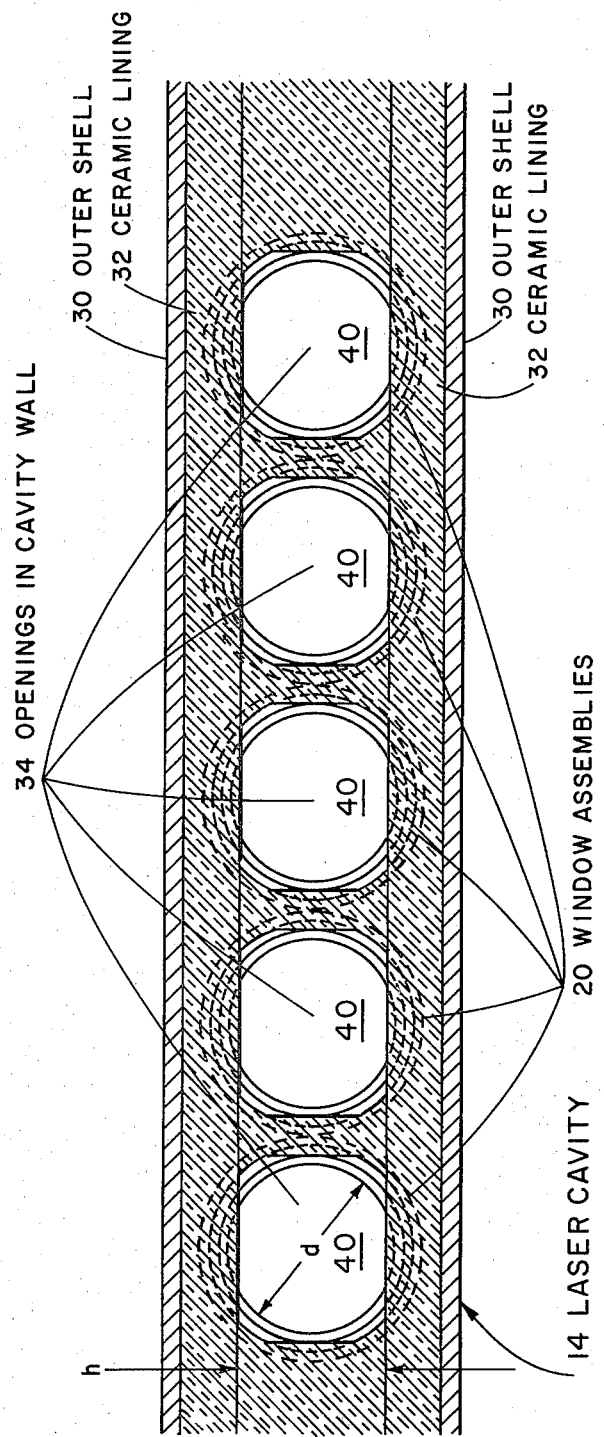
FIG. 2 is a cross-sectional view along 2—2 showing details of the penetration of the cavity wall.

Referring now to FIG. 2 it can be seen that the laser cavity 14 comprises an outer shell 30 of a material such as low carbon steel which is lined with an insulating layer 32 approximately 10 cm thick of a ceramic material such as alumina or magnesia. Such construction is conventional in power plants and is necessary to prevent heat loss from the gas stream, and also serves to protect outer shell 30 from the laser beams.

The height h of cavity 14 is approximately 20 cm and the width w is approximately 10 m giving for the air flow described above a mean particle velocity perpendicular to the cavity cross-section of approximately 88.5 m/sec.

The height h, of cavity 14 is limited by the diameter of the laser beams in a manner which will be described below. The width w, of cavity 14 is determined by the absorbtion of the laser energy by the gas stream and the shadowing effect of the particles in a manner which will be described below.

The laser beams travel through window assemblies 20 (which will be described more fully below) and enter the cavity 14 through openings 34 approximately 30 cm$\times$20 cm in size. There are 20 such openings 34 and associated assemblies 20 on each side of cavity 14 giving a total active length 1, of approximately 6.62 meters (allowing for the wall thickness of assemblies 20) which gives a pulse repetition rate of approximately 13.5 pulses per second, for a particle velocity of 88.5 meters/sec. (Only 5 of window assemblies 20 and openings 34 have been shown for ease of illustration.)

The laser beams as illustrated would illuminate approximately 82% of the active volume of cavity 14 which is approximately 13.24 meters$^3$. Preferably, however, the beams would be angled approximately 1° to 2° into the gas flow so as to form a chevron pattern of illumination. This would serve to prevent problems which might arise should the laser illuminate each other directly during an interruption of gas flow. This effect would slightly increase to volume illuminated. This angle has not been shown in the figures for ease of illustration.

Similarly, the divergence of the laser beams will tend to increase the volume illuminated. Preferably, the divergence should be minimal so as to maintain the energy density as the beam crosses the cavity. The effects of a divergence of approximately one milliradian, which is obtainable, are negligible.

Illumination of approximately from 50% to 90% of the active volume of cavity 14 is considered acceptable since the anticipated reduction in errosion should significantly increase the turbine blade life, while some erosion due to undestroyed particles is considered desirable to combat corrosion.

The one micro-second laser pulse length given above is chosen to satisfy several constraints. Shorter pulses, as opposed to near continuous wave operation, force the particles to fragment, due to shock formation, rather than heat up. However, shorter pulses, for a given energy per pulse, increase the power density which tends to cause ionization of the gas. Ionization is undesirable as it leads to unproductive absorbtion of laser energy in the gas stream.

Taking $10^8$ watts/cm$^2$ as the ionization threshold from Smith in the Journal of Applied Physics, Vol. 41, pg. 11, Oct. 1970 (which is hereby incorporated by reference) gives an energy density 100 joules/cm$^2$ for microsecond pulses. However, window materials presently available transparent to 10.6$\mu$ light require energy densities below 25 joules/cm$^2$ to avoid the possibility of damage. Therefore, an energy density of approximately 20 joules/cm$^2$ has been chosen. It is, however, within the contemplation of the present invention to provide higher energy densities as improved window materials are found. Finally, a pulse length of approximately a microsecond simplifies the laser switching requirements since for pulse lengths below approximately 0.1 microseconds more complicated laser switching mechanisms are required.

Referring to FIG. 2 it can be seen that a portion of the laser beam is not directed into cavity 14, but strikes insulating layer 32, since the beam diameter d is greater than the cavity height h. This configuration is necessary to insure that an adequate fraction of cavity 14 is illuminated. The energy which strikes layer 32 is converted to heat which is largely transferred to the gas stream, reducing the energy loss.

It is also within the contemplation of this invention to use laser beams having a non-circular cross-section so as to improve the percentage of laser cavity 14 illuminated. Such cross-sections may be produced by the proper shaping and positioning of mirrors 22.

For the system as described so far, then, 40 lasers, 20 on each side of cavity 14, each providing approximately $1.4 \times 10^4$ joules per pulse with a pulse length of approximately one microsecond, a pulse rate of approximately 13.5 pulses per second and a wavelength of approximately 10$\mu$ are required. As indicated above, CO$_2$ lasers meeting these requirements are well within the current state of the art and would be available from the suppliers listed above, among others.

WINDOWS

As the beam must pass through a window before entering the combustion product stream, consideration must be given to the demands placed upon such a window. The window material must withstand the high pulsed power densities, transmit efficiently, and not react chemically with the combustion product stream. Furthermore, there must be some way to protect the window from dust. Any dust particles which blow up while either on or very near the surface of the window will lead to unacceptable damage to the window.

For 10.6$\mu$ irradiation most materials with attractive properties are semiconductors or ionic solids. Attractive properties are: low absorption, high thermal conductivity, low thermal expansion, high specific heat, and low reflective losses. Table 1 lists some of these properties for several infrared materials. Furthermore, the material of choice must be resistant to both thermal and mechanical shock as well. Clearly, materials do presently exist that can survive within the proposed set of conditions. Some precautions and protective measures must be taken, however.

None of the materials listed may be expected to operate at the temperature of the combustion product stream (870° C.). Therefore, along with dust protection, thermal protection must be provided. NaCl and CaF$_2$ will be discarded as materials of choice due to their solubility in water. The remaining materials are to a greater or lesser degree acceptable. Many of the semiconducting windows exhibit thermal runaway (i.e., the absorption increases with temperature). Germanium must be maintained below 40° C. and GaAs must be maintaned below 250° C. for this reason.

A supplier capable of supplying suitable windows is:
Laser Optics, Inc.
POB 127
Danbury, Conn. 06810

Figure 3:
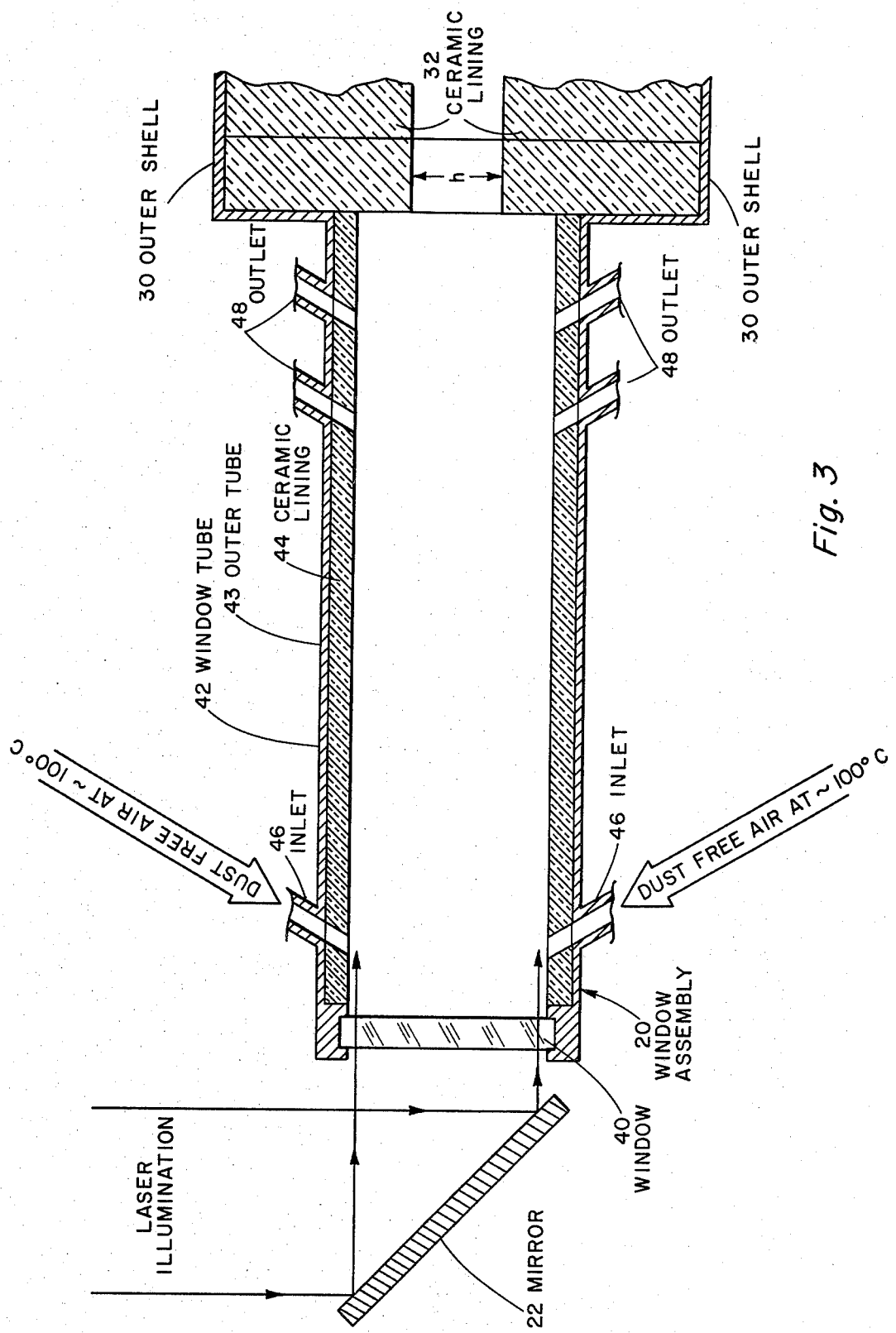
FIG. 3 is a cross-sectional view along 3—3 showing details of the window assemblies.

Referring to FIG. 3 window assembly 20 comprises a window 40 formed from one of the materials listed in Table 1, or from a similar material. Preferably, window 40 will be a disk of GaAs, approximately 3 to 5 cm thick having a diameter slightly greater than 30 cm. Window 40 is mounted in window tube 42 which comprises an outer tube 43 of a material such as ¼ inch carbon steel and ceramic insulating lining 44 approximately 1 cm thick preferably formed from alumina or magnesia.

Dust-free cooling air, at a temperature of approximately 100° C. blows through inlets 46 and over window 40. The cooling air flows along tube 42 and out through outlets 48. The cooling air may then be vented to the atmosphere after any treatment necessary to reduce emission and/or recover waste heat. Several considerations are important in the design of window assembly 20. With the incoming cooling air at a temperature of approximately 100° C. and the gas stream at a temperature of approximately 870° C. the window assembly 20 should have a length of approximately 10 m in order to establish the necessary temperature gradient. Care must then be taken to establish the pressure, flow rates and flow patterns of the cooling air so that there is minimal escape of hot gases into window assembly 20, as this would represent an undesirable energy loss and the presence of significant amounts of CO$_2$ in window assembly 20 would cause unacceptable attenuation of the laser beam. Such design consideration may easily be taken into account by a person skilled in the art.

Supports, not shown, preferably should also be provided at the window end of assembly 20 since the end attached to cavity 14 will be more exposed to the high temperature gas stream and possibly weakened.

Still referring to FIG. 3, it is preferred that the laser, not shown, be mounted not directly in line with window assembly 20, but be offset for ease of mounting, assembly, access, etc. The beam may then be directed through window 40 by means of mirror 22. Suitable mirrors may be formed from turned copper.

It is also preferred that the pressure gradient across window 40 be minimal. This necessitates that the laser, not shown, and mirror 22 be at a pressure approximately equal to that of the gas stream. The pressure vessel needed for this is not shown for ease of illustration.

Figure 4:
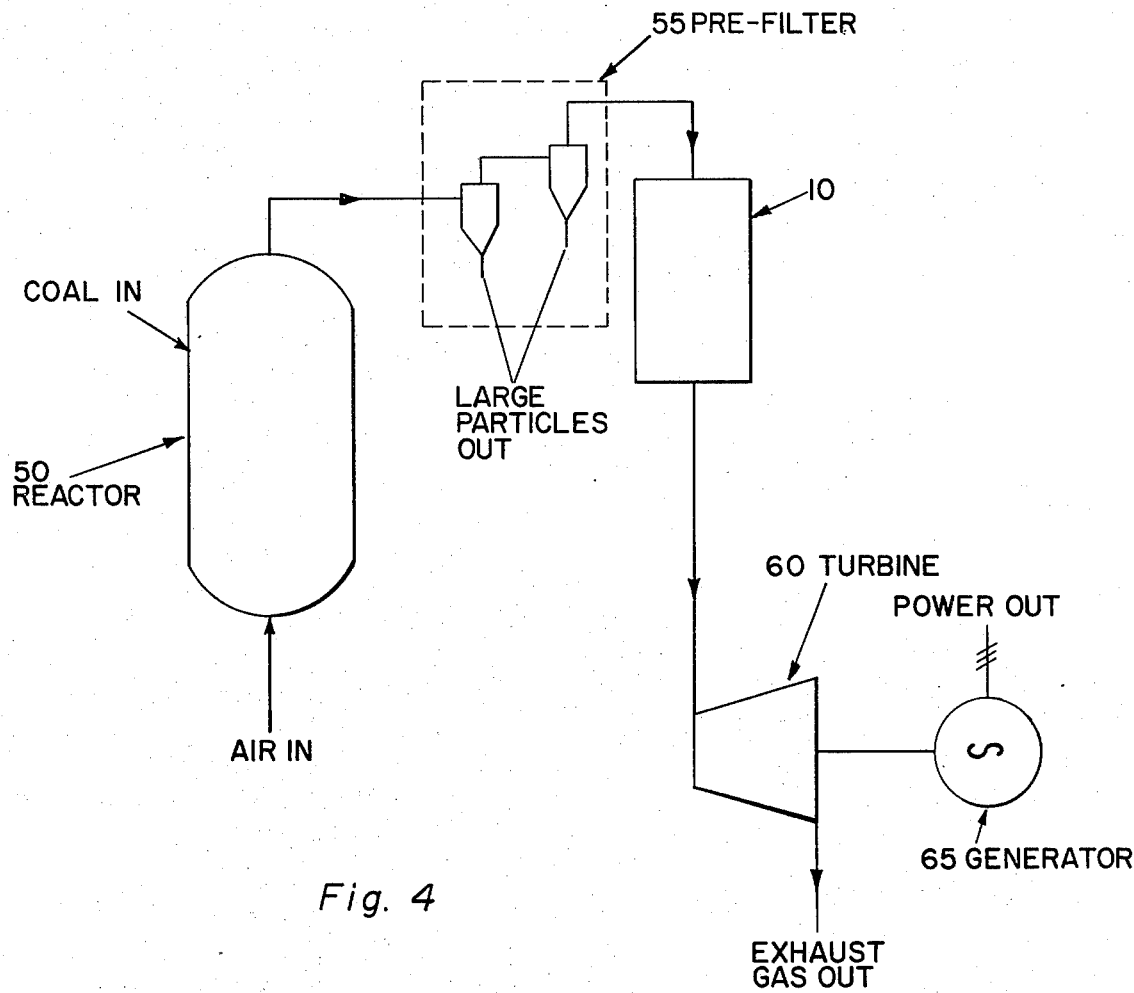
FIG. 4 is a schematic representation of a power generating system incorporating subject invention.

Referring now to FIG. 4, there is shown a schematic representation of a power generating system incorporating the subject invention. Coal may be burned by any of several methods well-known in the art in Reactor 50. Hot combustion gases are drawn off from Reactor 50 and prefiltered by conventional means 55, such conventional means may include conventional or modified cyclones and/or electrostatic precipitators. The gases, which now contain essentially no particulates greater than about 10 microns in size, are now passed through the apparatus of the subject invention 10, wherein said particulates are destroyed. The hot pressurized gases may now be used to directly drive turbine 60 for the generation of electrical power by generator 65.

GENERAL DESIGN CONSIDERATION AND CONSTRAINTS FOR OPTIMUM PERFORMANCE

In light then of the description of the preferred embodiment, the following general design considerations are apparent:

(1) The laser wavelength is constrained for reasons of energy density requirements and absorption efficiency, to be approximately equal to or less than the mean particle diameter. (It should be noted that as lasers having a shorter wavelength and sufficient power become available, they may prove to be more desirable than the presently preferred $10.6\mu$ $CO^2$ lasers.)

(2) Given the laser wavelength, the choice of window materials is determined by the absorption of energy of the material at that wavelength. As in the embodiment discussed above means for protecting the window may have to be provided, however, for shorter wavelengths, glass windows requiring less protection may be suitable.

(3) Given the laser wavelength the width of the cavity is determined by the absorbtion of energy in the gas stream and/or the shadowing effect and the need to maintain sufficient energy density to insure particle destruction effect. By shadowing effect herein is meant columns created behind particles (with respect to the path of the laser beam) when the particle scatters or absorbs laser light wherein no particles may be destroyed due to attenuation of the beam. For $10.6\mu$ light the absorbtion by $CO_2$ and $H_2O$ in the gas stream is the dominant effect. For the example discussed above the intensity (due to a single beam is given approximately by:

$$I(x) = I_0 e^{-2.7 \times 10^{-3} x}$$

where $I_0$ is the beam intensity when the beam enters the cavity and x is the distance traversed by the beam in centimeters. This limits the cavity width (for two sided illumination) to approximately 10 meters.

For shorter wavelengths the shadowing effect may become more important than absorbtion. An approximate function for the extinction distance (D), which determines cavity width, when shadowing is dominant, (for two-sided illumination) is:

$$D = 2d/1.5\eta$$

where d is the mean particle diameter and $\eta$ is the volume fraction of particles.

(4) The minimum energy density per pulse is constrained by the energy required to insure destruction of particles. This in turn is determined by the size distribution of the particles. A conservative assumption is that the entire particle mass is made up of particles of maximum size.

(5) The maximum power density is constrained by the need to avoid damage to the windows and/or ionization of the gas stream.

(6) The pulse length is determined by the need to deliver at least the minimum energy density per pulse in as short a pulse as possible (to encourage fragmentation of the particle) while not exceeding the power density constraints or requiring excessively complex laser switching mechanisms.

(7) Given the energy density per pulse (power density x pulse length) beam diameter is determined by the maximum energy per pulse available lasers of the chosen wavelength are capable of providing.

(8) Given the beam diameter the cavity height is determined by the need to insure that a sufficient fraction of the cavity volume is illuminated.

(9) Given the cavity height and width the mean velocity perpendicular to the cross-section is determined by the cross-sectional area.

(10) Given the mean velocity the minimum number of lasers is determined by the maximum pulse repetition rate lasers of the chosen specifications are capable of providing. Additional redundant lasers may be provided to increase system reliability.

It will be obvious to those skilled in the art that other embodiments than that discussed above may be developed within the scope of the disclosure of the subject invention. Therefore, the above description of the preferred embodiment should be considered as illustrative and not limiting, the limitations on the scope of the claimed invention being set forth only in the claims set forth below.

TABLE 1

| | Thermal and optical properties of some candidate window materials. | | | | | |
|---|---|---|---|---|---|---|
| | ZnSe | Ge | GaAs | Si | CaF$_2$ | NaCl |
| Absorption cm$^{-1}$ | .0005 @10.6$\mu$ | .03 @10.6$\mu$ | .02 @10$\mu$ | .036 @10.6$\mu$ | .005 @3.8$\mu$ | 0.0013 @10.6$\mu$ |
| Thermal conductivity W/mC | .08 | .59 | .40 | 1.63 | .10 | .09 |
| Thermal expansion coeffic. °C.$^{-1}$ | $8.5 \times 10^{-6}$ | $5.5 \times 10^{-6}$ | $5.7 \times 10^{-6}$ | $4.2 \times 10^{-6}$ | $2.4 \times 10^{-5}$ | $3.89 \times 10^{-5}$ |
| Specific heat | | | | | | |

TABLE 1-continued

| Thermal and optical properties of some candidate window materials. | | | | | |
|---|---|---|---|---|---|
| ZnSe | Ge | GaAs | Si | CaF$_2$ | NaCl |
| J/g°C.     .36 | .31 | .27 | .70 | .85 | .85 |

What is claimed is:

1. A method for the production of a gas stream significantly free of particles larger than about 2 to 5 microns said method comprising the step of:
   (a) producing a particulate laden gas stream by the combustion of coal;
   (b) passing said particulate laden gas stream through a cavity, said cavity having associated with it laser means for providing illumination of appropriate wavelength and energy density to destroy particles, and having window means for admitting said laser illumination; and,
   (c) exposing a significant portion of said particles to said laser illumination.

2. A method as described in claim 1 wherein said gas stream is used after step b for powering turbines.

3. A method as described in claim 1 wherein the gas stream is pre-filtered to limit the maximum size of the particles to approximately 10 microns.

4. A method as described in claim 1 wherein said laser illumination has a wavelength less than approximately 20 microns.

5. A method as described in claim 1 or in claim 4 wherein said particles are exposed to said laser illumination having an energy density per pulse greater than approximately $5.1 \times 10^{-4}$ joules/cm$^2$.

6. An apparatus for the production of a gas stream substantially free of particles larger than about 2 to 5 microns; said apparatus comprising:
   (a) combustion means for producing a particulate laden gas stream by the combustion of coal;
   (b) particle destruction apparatus further comprising:
      (b1) structure means for containing such a particulate laden gas stream within a cavity;
      (b2) intake and exhaust means for maintaining the flow of such a particulate laden gas stream through said cavity;
      (b3) laser means for providing illumination of appropriate wavelength and energy density to a significant portion of said cavity at a sufficient pulse rate whereby a significant portion of the particles in the gas stream will be destroyed by exposure to said illumination as they pass through said cavity; and,
      (b4) window means associated with said cavity for admitting said illumination into said cavity, said window means further comprising windows formed of material having a low absorption of said illumination so as to reduce the amount of energy absorbed by said windows and thereby reduce the possibility of damage to said windows; and,
   (c) means, connecting said combustion means with said intake means of said particle destruction apparatus, for conducting said particulate laden gas stream from said combustion means to said intake means whereby the particulate laden gas stream will flow through said particle destruction apparatus and a significant portion of the particles will be destroyed producing the gas stream significantly free of particles larger than about 2 to 5 microns.

7. The apparatus of claim 6 wherein said conducting means further comprises preliminary means for the removal of particles larger than about 10 microns.

8. An apparatus as described in claim 6 wherein said laser illumination has a wavelength less than 20 microns.

9. An apparatus as described in claim 8 wherein said laser means has a wavelength of approximately 10 microns.

10. An apparatus as described in claim 9 wherein said windows are formed from a material chosen from the group consisting of zinc selinide, germanium, gallium arsenide and silicon.

11. An apparatus as described in claim 10 further comprising means for maintaining said windows at a temperature below approximately 250° C.

12. An apparatus as described in claim 8 wherein the energy density per pulse of said laser means is approximately 20 joules/cm$^2$.

13. An apparatus as described in claim 8 wherein the pulse length of said laser means is approximately one microsecond.

14. An apparatus as described in claim 6 wherein said laser means is a CO$_2$ laser.

15. An apparatus as described in claim 6 wherein the energy density per pulse within various portions of said cavity which are illuminated is between approximately 5 joules/cm$^2$ and 100 joules/cm$^2$ and the pulse length of said laser means is approximately 1 microsecond.

16. An apparatus as described in claim 6 wherein the volume percentage of said cavity which will be exposed to sufficient laser energy to cause particle destruction is from 50 to 90 percent.

* * * * *